Aug. 11, 1942.   H. McINTYRE   2,292,578
VEHICLE PROPULSION
Filed July 11, 1939   4 Sheets-Sheet 2

Inventor
Hugh McIntyre
by  [signature]
Atty

Aug. 11, 1942.    H. McINTYRE    2,292,578
VEHICLE PROPULSION
Filed July 11, 1939    4 Sheets-Sheet 4

Inventor
Hugh McIntyre
By
Atty.

Patented Aug. 11, 1942

2,292,578

UNITED STATES PATENT OFFICE 2,292,578

VEHICLE PROPULSION

Hugh McIntyre, Kirkland Lake, Ontario, Canada

Application July 11, 1939, Serial No. 283,909

6 Claims. (Cl. 180—9.2)

The invention relates to improvements in vehicle propulsion as described in the present specification and shown in the accompanying drawings that form a part of the same.

The invention concerns particularly the driving and steering of a vehicle having as running gear a series of independent transversely aligned tractor elements and the main objects of the invention are to provide an individual drive to each tractor and thus make possible individual springing of the tractors whereby same may rise and fall independently of each other in the passage of the vehicle over rough ground or over obstacles; to provide a driving means whereby the central tractor element shall always have a direct drive from the engine thereby providing a fulcrum whereby the relative speeds of the tractor elements on each side of the central one are controlled automatically and thus facilitate the turning of the vehicle and the operation thereof when moving in the arc of a circle; and to provide simple and efficient driving means which may be readily adapted to any desired number of such tractor elements.

The invention consists in the novel features of construction, arrangements and combinations of parts described in the present specification and more particularly set out in the claims for novelty following.

In describing the invention reference will be made to the accompanying drawings in which:

Figure 4 is a diagrammatic view showing the form of countershaft employed to give drives to nine tractor elements.

Figure 5 is a diagrammatic view showing the countershaft adapted to drive seven tractor elements.

Figure 6 is a diagrammatic view showing the countershaft adapted to drive three tractor elements.

Figure 7 is a central sectional view through one of the subsidiary differentials to show a modification of the braking device.

Like numerals of reference indicate corresponding parts in the various figures.

Figure 1:
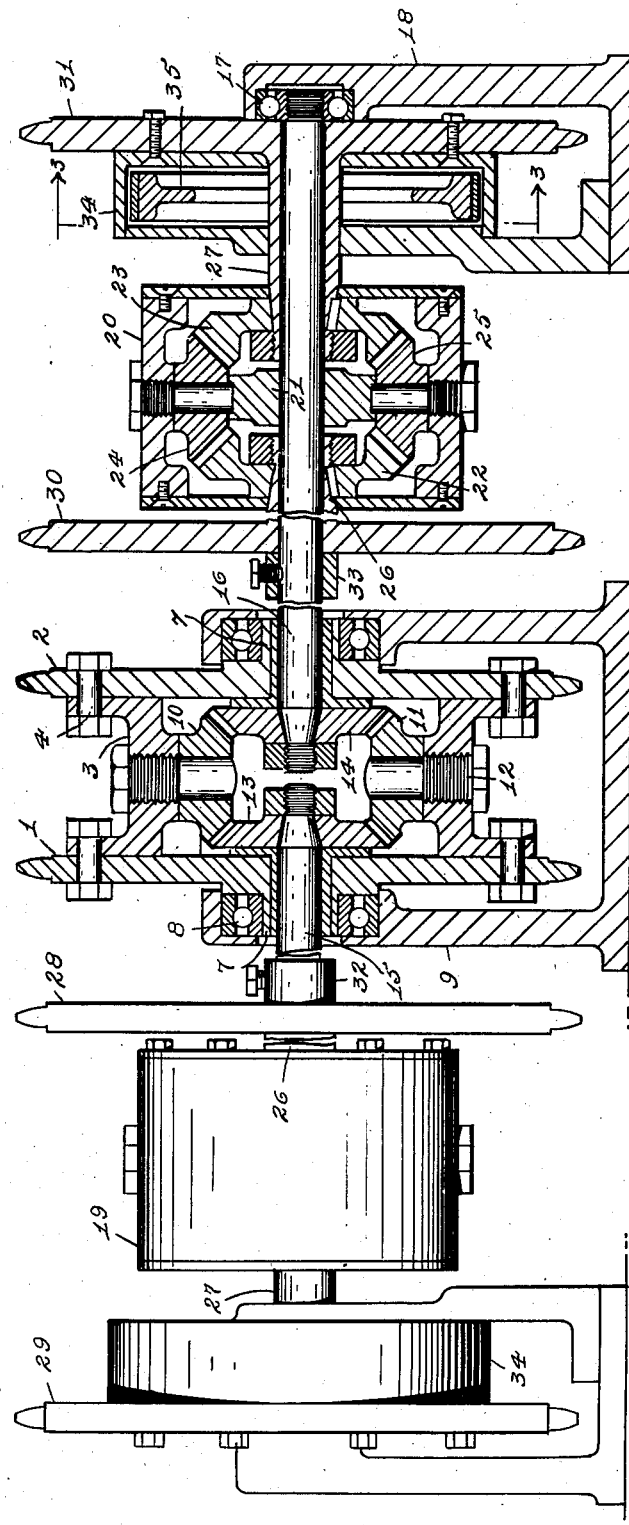
Figure 1 is a side elevation, partly in central longitudinal section, through the preferred form of countershaft employed to drive five tractor elements.
Figure 2:
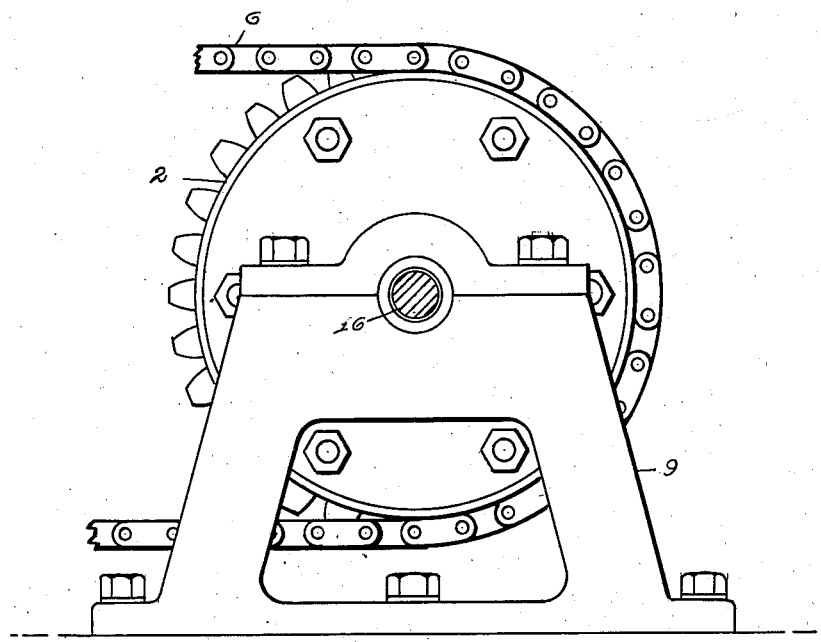
Figure 2 is a side elevation of the main differential and bearing.
Figure 3:
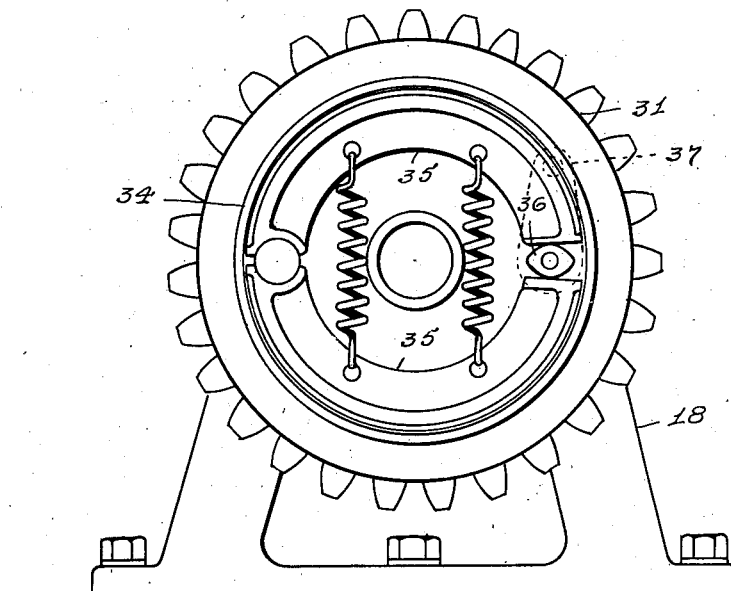
Figure 3 is a cross sectional view taken on the line 3—3 of Figure 1.
Figure 8:
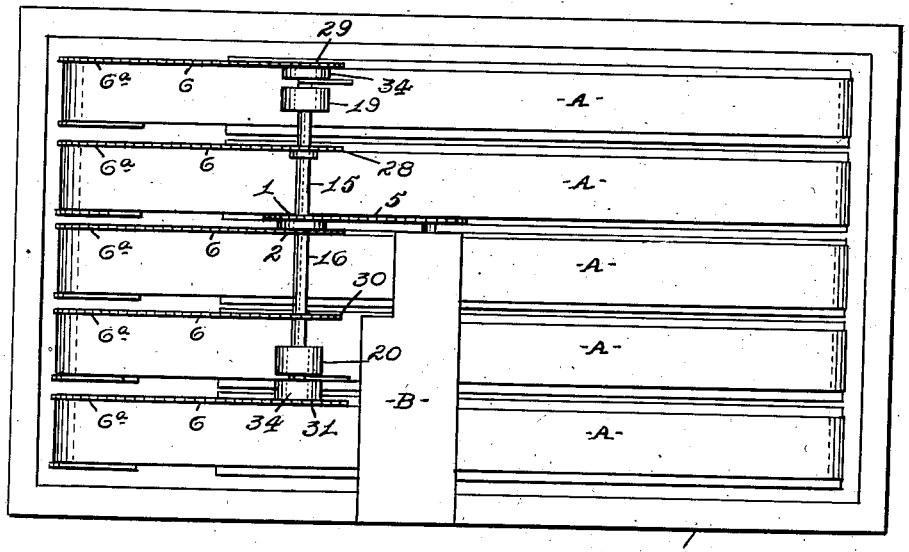
Figure 8 is a plan view of a vehicle chassis embodying my improved propulsion and steering mechanism.
Figure 9:
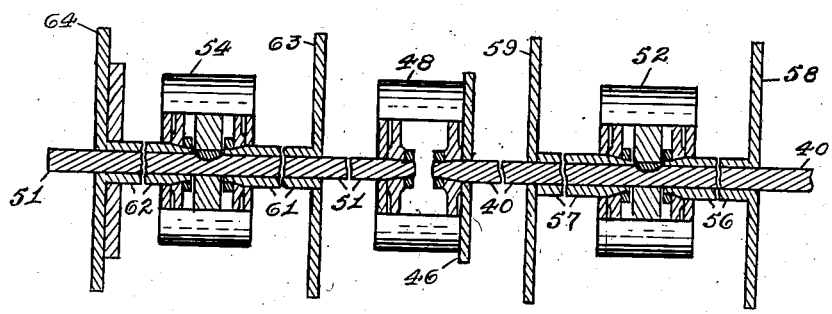
Figure 9 is an enlarged view of a portion of the structure shown in Figure 4, with parts shown in cross section.

My countershaft consists of a main differential and a series of subsidiary differentials by means of which the relative speeds of the multiple tractor elements A are automatically controlled and the number of such subsidiary differentials is dependent upon the number of tractors and belts embodied in the vehicle. For purposes of illustration I have shown in detail in Figure 1 a countershaft adapted to drive five tractor elements and I will now refer in particular to such Figure 1 and other figures relating to such construction.

The main differential is located in substantially the transverse centre of the vehicle and preferably consists of two parallel sprockets, gears or pulleys, 1 and 2, spaced from each other by a spacing member 3 which may be secured to such sprockets, gears or pulleys, by bolts 4, or by other suitable means. One of the sprockets, herein shown as the sprocket 1, has a driving connection 5 with the engine, or other prime mover B, and the other sprocket, 2, is connected by any suitable means such as by a belt or chain, 6, to the pulley or sprocket 6ª which operates the central tractor element A whereby to provide a direct and constant drive from the engine to said central tractor element.

The sprockets, gears or pulleys 1 and 2 are each provided with an outwardly extending hub 7 suitably journalled in bearings 8 in a frame 9 whereby the whole main differential assembly which is hereinafter termed a casing is free to rotate through the medium of the engine and to cause rotation of the sprocket 2 and consequently movement of the central tractor element.

10 and 11 are planet pinions positioned between the sprockets 1 and 2 and held in position by suitable spindles 12 threading through the members 3, the said pinions engaging oppositely disposed sun gears 13 and 14 which are fixedly mounted on the inner ends of the main shaft sections 15 and 16, which latter extend outwardly from opposite sides of the casing through the hubs 7 and at their extreme outer ends are journalled in suitable bearings 17 in supports 18.

19 and 20 are subsidiary differential casings located at opposite sides of the main differential and fixed immovably through central webs 21 to the main shafts 15 and 16 respectively.

The subsidiary differentials are each substantially similar to the main differential, including as they do, side pinions or gears 22 and 23, and planet pinions 24 and 25. These side pinions 22 and 23 are fixed to sleeves 26 and 27 respectively which are rotatably mounted on the main shafts 15 and 16, extending inwardly and outwardly to carry sprockets 28 and 29 and 30 and 31 respectively, which sprockets, pulleys or gears, are aligned with the respective sprockets, pulleys or gears 6ª operating the tractor elements and are connected therewith by chains 6, or by belts or gearing. Thrust blocks 32 and 33 are provided to take up the end thrust on the sprockets 28 and 30.

The endmost sprockets 29 and 31 are each provided with a brake drum 34 within each of which is mounted the internal expanding brake sections 35 and an appropriate spreader 36, which latter are controlled by suitable levers 37 which in turn have connection with suitable brake rods, which latter are not shown in the drawings as the particular construction of same does not constitute a feature of the present invention, and applicant does not wish to limit himself to any specific means of applying the brakes as brakes suitable to the present purpose and means of applying same are well known.

In the operation of this invention the power is transmitted from the engine to the main differential of the countershaft through the drive 5 operating over the sprocket 1. This causes the main differential to be rotated and thus in turn through the medium of the drive 6 connecting the sprocket 2 with the sprocket of the central tractor element providing a constant drive at engine speed to said central tractor. The rotation of the main differential causes, through the meshing of the planet gears 10 and 11 with the sun gears 13 and 14, the side shafts 15 and 16 to be rotated and as these shafts are fixed to the members 21 of the subsidiary differentials 19 and 20 the latter will also be rotated. As the planet pinions 24 and 25 are fixed to the subsidiary differential casings they will be rotated therewith and will in turn cause the rotation of the side gears 22 and 23, thereby rotating the sleeves 26 and 27 and the sprockets 28, 29, 30 and 31. It will thus be apparent that so long as the brakes are free the power will be transmitted evenly throughout the length of the countershaft driving all of the sprockets 2, 28, 29, 30 and 31 at the same rate of speed and as each of the last mentioned sprockets is connected by a belt, or other device 6 to a pulley, sprocket or other device over which operates the belt of the associated tractor all of the tractors will be driven at like speed and the vehicle will travel in a straight line.

When it is desired to deviate from a straight course the brake applying mechanism, which may be of any suitable type to expand the members 35 on the side of deviation, is manipulated. It will be obvious that when one of the brakes is applied to slow down the movement of one or the other of the side shafts 15 or 16, the other side shaft will rotate at a correspondingly greater speed because the casing of the main differential—and so the central tractor—is driven at a constant speed and is unaffected by the braking. This greater speed of one side shaft over the other reacts directly on the attached subsidiary differentials 19 and 20 and through them the relatively correct speeds of the sprockets 28 and 29 and 30 and 31 will result automatically. The rotation of each sprocket is carried directly to its tractor drive and thus the variable speeds increasing from the braked side to the opposite side will cause the vehicle to deviate from a straight line according to requirement.

In Figure 4 a countershaft suitable to the driving of a vehicle employing nine tractors is shown.

In this construction the main differential has a sprocket connected by a chain, or other connection, 5, with the engine and has a fixed gear 38 meshing with a gear 39 rotating freely on a shaft 40 which extends transversely of the vehicle. The gear 39 has a sprocket 41 fixed thereto and this sprocket is connected by a chain, or other connection, 42 operatively with the central tractor whereby to provide a constant drive for said central tractor.

The main differential has the usual side shafts 15 and 16 mounted at their extreme ends in suitable bearings, indicated by the numeral 43.

The side shafts 15 and 16 have gears 44 and 45 respectively fixed thereto and meshing with gears 46 and 47 respectively fixed to secondary differential casings 48 and 49.

The secondary differentials are constructed similarly to the main differential in that they include planet pinions and side shaft pinions. The inner side shaft pinions each have fixed thereto the corresponding end of the shaft 40 while the outer side shaft pinions have fixed thereto the inner ends of side shafts 51, the shaft 40 being fixed to differential casings 52 and 53 respectively and the outwardly extending side shafts 51 being fixed to differential casings 54 and 55 respectively. The differential casings 52, 53, 54 and 55 are also constructed similarly to the main differential casing in that they are provided with planet pinions and side shaft pinions. The side shafts or sleeves 56 and 57 of the differential casings 52 and 53 have fixed thereto at opposite ends sprockets 58 and 59 respectively which have connection by means of chains or other devices, 60, with the aligned tractors, and the hollow side shafts 61 and 62 extending in opposite directions from the respective differential casings 54 and 55 have sprockets 63 and 64 connected by chains, or other devices, 60, with aligned tractors.

In the operation of this modification adapted to the driving of nine tractors the main differential driven by the engine provides a constant drive for the centre tractor while the side shafts rotate the gears 44 and 45 which in turn drive the secondary differential casings 48 and 49. The differential 48 through its side shafts 40 and 51 drive the differentials 52 and 54 at one end of the countershaft and consequently the sprockets 58, 59, 63 and 64 connected to the aligned tractors and the differential 47 near the other end of the countershaft, through its side shafts 40 and 51, drives the differentials 53 and 55 and consequently the sprockets 58, 59, 63 and 64 and their aligned tractors at the other end of the countershaft.

The countershaft shown in Figure 5 is adapted to drive seven tractors and the construction differs only from that shown in Figure 1 in that each of the subsidiary differential casings 19 and 20 has a sprocket 65 fixed thereto and each of said sprockets is operatively connected by a belt, chain, or other device, 66 with the pulley, sprocket or other device of the aligned tractor.

The countershaft shown in Figure 6 is adapted to drive three tractors and consists of the usual main differential having its sprocket 1 connected to the engine and its sprocket 2 connected with the centre tractor, while the side shafts 15 and 16 each carries a sprocket 67 or other device operatively connected by a chain, or other device 68 to the respective side tractors.

It has not been considered necessary to show in the drawings the countershaft applied to more than nine tractors as the principle of the countershaft has been amply demonstrated in the illustrations showing it applied to three, five, seven and nine tractors, but it is of course apparent that it can be adapted to drive a greater odd number of tractors by the simple expedient of providing one or more of the subsidiary differentials at each side of the main differential with a fixed sprocket, gear, or pulley and operatively connecting same to the aligned tractors. For instance to drive eleven tractors it is only necessary to provide each of the secondary differential casings 48 and 49 (shown in Figure 4) with a fixed sprocket and connect same by chain, belt or other device with the aligned tractors.

In Figure 7 of the drawings an alternative form of braking means is shown in which one of the subsidiary differentials at each side of the main differential is provided with an interior annular brake drum 69 around which operates a brake band 70 which in turn is connected to suitable apparatus by means of which the band may be tightened and released.

While certain preferred embodiments of the present invention have been herein shown and described it is of course to be understood that alterations in details of construction and arrangements of parts as comes within the scope of the following claims for novelty may be made.

What I claim is:

1. A motor vehicle having a plurality of ground engaging elements of uneven number, a main differential including a casing, a plurality of subsidiary differentials having driving connections with said main differential, means providing a constant drive from a power unit through the casing of said main differential to the central one of the ground engaging elements whereby the latter provides a fulcrum to control the relative speeds of two or more subsidiary differentials, and interconnected brakes on each side of said main differential whereby to control the rotation of one or other of the drives to said subsidiary differentials without affecting the speed of rotation of said main differential, two of said ground engaging elements being actuated by each of the said subsidiary differentials, whereby the speeds of said ground engaging elements are controlled automatically by the relative speeds of rotation of said main differential and the subsidiary differentials.

2. A motor vehicle having a series of ground engaging elements of uneven number, a main differential, including a casing, a sectional driving shaft, sun wheels and planet wheels, the casing being driven by a prime mover and driving directly a central ground engaging element, the planet wheels being carried by the casing and meshing with two sun wheels, each of which is independently connected to a section of the driving shaft; subsidiary differentials centrally fixed to and driven by said sections of the drive shaft on each side of the main differential, planet wheels carried by the casings of the said subsidiary differentials and meshing with two sun wheels in each subsidiary differential, said sun wheels being connected to subsidiary drive shafts on each side of the subsidiary differentials and each affording a drive to a ground engaging element, means for braking the drives to the subsidiary differentials on each side of the main differential to change the driven speed of the subsidiary differentials relative to the speed of the main differential casing and so the speeds of the ground engaging elements with which the subsidiary differentials are connected in relation to each other and to the constant speed of the element driven by the casing of the main differential.

3. A differential drive for vehicles having a plurality of ground engaging elements, including a prime mover, a main differential having a casing, a ground engaging element connected to the casing and driven directly therewith by said prime mover, planet wheels carried by the said casing, sun wheels rotatable in the casing and engaging with the planet wheels, a side shaft driven by each sun wheel and extending on each side beyond the casing, a subsidiary differential casing fixed to each side shaft beyond the main differential casing and rotated by the said side shafts, planet wheels carried by each of said subsidiary differential casings, sun wheels rotatable in said subsidiary differential casings and meshing with the last mentioned planet wheels, subsidiary side shafts on each side of each subsidiary differential driven by the sun wheels within said subsidiary differential casings, said subsidiary side shafts, being connected to independent ground engaging elements; and braking means whereby the side shafts of the main differential may be selectively braked thereby to vary the speed of the ground engaging elements on each side of and relative to the constant drive speed of the element connected to the main differential casing.

4. A construction as defined in claim 3 wherein the main differential and subsidiary differentials are arranged in alignment transversely of the vehicle.

5. A construction as defined in claim 3 wherein the casings of the main and subsidiary differentials are mounted in supports through which the respective shaft sections are guided for independent rotation.

6. A construction as defined in claim 3 wherein the driving means to the ground engaging elements from the subsidiary differentials are interrupted by other subsidiary differentials on a parallel shaft line, each of which other subsidiary differentials has connection with certain of said ground engaging elements and is controlled in speed by similar braking means of the sideshafts of the main differential whereby to increase the number of ground engaging elements.

HUGH McINTYRE.